US010620417B2

(12) United States Patent
Stoppe et al.

(10) Patent No.: US 10,620,417 B2
(45) Date of Patent: Apr. 14, 2020

(54) METHOD FOR GENERATING A REFLECTION-REDUCED CONTRAST IMAGE AND CORRESPONDING DEVICE

(71) Applicant: Carl Zeiss Microscopy GmbH, Jena (DE)

(72) Inventors: Lars Stoppe, Jena (DE); Thomas Milde, Nausnitz (DE); Johannes Winterot, Jena (DE); Christoph Husemann, Jena (DE)

(73) Assignee: Carl Zeiss Microscopy GMBH, Jena (DE)

( * ) Notice: Subject to any disclaimer, the term of this patent is extended or adjusted under 35 U.S.C. 154(b) by 249 days.

(21) Appl. No.: 15/569,547

(22) PCT Filed: Apr. 27, 2016

(86) PCT No.: PCT/EP2016/059400
§ 371 (c)(1),
(2) Date: Oct. 26, 2017

(87) PCT Pub. No.: WO2016/174084
PCT Pub. Date: Nov. 3, 2016

(65) Prior Publication Data
US 2018/0307024 A1    Oct. 25, 2018

(30) Foreign Application Priority Data
Apr. 30, 2015 (DE) .................. 10 2015 208 087

(51) Int. Cl.
*G02B 21/14* (2006.01)
*G02B 21/36* (2006.01)
*G06T 5/50* (2006.01)

(52) U.S. Cl.
CPC ........... *G02B 21/14* (2013.01); *G02B 21/367* (2013.01); *G06T 5/50* (2013.01);
(Continued)

(58) Field of Classification Search
CPC ........ G02B 21/06; G02B 21/14; G02B 21/18; G02B 21/36; G02B 21/365; G02B 21/367;
(Continued)

(56) References Cited

U.S. PATENT DOCUMENTS

| 7,158,099 B1 | 1/2007 | Berube et al. |
| 2009/0066929 A1* | 3/2009 | Tropf ............... G01B 11/2513 356/3.12 |

(Continued)

FOREIGN PATENT DOCUMENTS

| EP | 2 818 095 | 12/2014 |
| WO | WO-2015-012279 | 1/2015 |

OTHER PUBLICATIONS

Tian et al., "3D Differential Phase-Contrast Microscopy with Computational Illumination Using an LED Array", Optics Letters, vol. 39, No. 5, Mar. 1, 2014, pp. 1326-1329.
(Continued)

*Primary Examiner* — Stephone B Allen
*Assistant Examiner* — Adam W Booher
(74) *Attorney, Agent, or Firm* — Nixon Peabody LLP; Jeffrey L. Costellia (57) ABSTRACT

The invention relates to a reflection-reduced contrast imaging method and to a device for generating a reflection-reduced contrast image, preferably from microscopic images, in particular in order to read height progression information of a condition of an object. The reflection-reduced contrast imaging method comprises: illuminating an object by means of an illumination sequence, creating an illumination image of the object for each illumination of the object of the illumination sequence, determining a reflection-corrected illumination image for each illumination image, superposing each pair of reflection-corrected illumination images that are adjacent with respect to the first axis in order to form a first whole axis image of the first axis, superposing each pair of reflection-corrected illumination images that are adjacent with respect to the second axis in order to form a second whole axis image of the second axis, creating a first color progression image on the basis of the first whole axis image, creating a second color progression
(Continued)

image on the basis of the second whole axis image, transforming the first color progression image and the second color progression image into a color space, generating a contrast image on the basis of the first color progression image and the second color progression image transformed in the color space.

14 Claims, 7 Drawing Sheets (52) U.S. Cl.
CPC ........... *G06T 2207/10056* (2013.01); *G06T 2207/10152* (2013.01); *G06T 2207/20221* (2013.01)

(58) Field of Classification Search
CPC ............ G06T 5/50; G06T 2207/10056; G06T 2207/10152; G06T 2207/20212–20224; H04N 5/23229; H04N 5/235
See application file for complete search history.

(56) References Cited

U.S. PATENT DOCUMENTS

| | | |
|---|---|---|
| 2014/0002723 A1 | 1/2014 | Cook et al. |
| 2014/0152876 A1 | 6/2014 | Adachi et al. |
| 2014/0198197 A1 | 7/2014 | Kaminaga |
| 2015/0065877 A1 | 3/2015 | Orderud |

OTHER PUBLICATIONS

Feris et al., "Specular Reflection Reduction with Multi-Flash Imaging", Proceedings of the XVII Brazilian Symposium on Computer Graphics and Image Processing (SIBGRAPH1'04), 2004, vol. 42, pp. 316-321.

Hang, et al. "Cell Segmentation Via Spectral Analysis on Phase Retardation Features", 2013, IEEE 10th International Symposium on Biomedical Imaging: for Nano to Macro, 2013, pp. 1469-1475.

Alessandro et al., "A Survey of Specularity Removal Methods", Computer Graphics forum, vol. 30, 2011, No. 8, pp. 2208-2230.

Amit et al., "Removing Photography Artifacts using Gradient Projection and Flash-Exposure Sampling", In: ACM Transactions on Graphics 24, 3, 2005, pp. 828-835.

International Search Report for PCT/EP2016/059400 dated Aug. 30, 2016.

German Office Action 10 2015 208 087.0 dated Jan. 22, 2016.

German International Search Report for PCT/EP2016/059400 dated Aug. 30, 2016.

German Written Opinion for PCT/EP2016/059400 dated Aug. 30, 2016.

Notification of Transmittal of Translation of the International Preliminary Report of Patentability, with translation of International Preliminary Report of Patentability, and with translation of Written Opinion of the International Searching Authority for PCT/EP2016/056400, 8 pages, dated Nov. 9, 2017.

\* cited by examiner

METHOD FOR GENERATING A REFLECTION-REDUCED CONTRAST IMAGE AND CORRESPONDING DEVICE

TECHNICAL FIELD

The present invention relates to a method for generating a reflection-reduced contrast image, in particular for reading height progression information and/or phase progression information of a condition of an object in a preferably digital, microscopic image and corresponding devices.

BACKGROUND

In classic biological microscopy as well as in material microscopy different forms of contrast methods are used in addition to the normal bright field imaging in order to obtain additional information about the observed object. Examples for this are the phase contrast method, (for example Zernike, differential interference contrast—DIC) or also alternative image generation methods, (for example dark field). Currently, variants are described about how contrast images can be calculated from individual images. In the previous publications DIC alternatives are described in this context, wherein this leads as a rule to grey images and wherein the quality of the calculated contrast images is heavily dependent on the direction. In general, all described contrasts have the disadvantage that they emphasize a special quality of the object but on the other hand ignore or attenuate other qualities. For example, DIC methods for the digital analog of the forming of the difference of images of opposite illumination directions (DPC) have the disadvantage that they generate only direction-dependent grey value images.

Furthermore, undesired reflexes can occur during a recording of an image with an optical system with illumination which are based on the interaction between illumination, object and system, and which deteriorate the image recording and/or the image impression. Important details of the image can be lost by such reflexes. These reflexes can have two different reasons: On the one hand an image reflection which occurs by a multiple reflection within the optical system (system reflexes), and on the other hand an image reflection due to high reflectivity of the object to be investigated in special directions, in particular during incident light illumination.

It is sometimes attempted in the prior art to correct occurring reflexes digitally by reworking an image in that, for example, a rise of a brightness difference is compensated in an image part of the imaged object or by modeling the reflex condition of the object by mathematical models and the attempt is made to calculate the reflections obtained as a result out of the image. These reworking methods have the disadvantage that they can largely remove reflections occurring in the image only in special cases. Another disadvantage here can be the fact that the imaged object can be falsified.

Therefore, it would be desirable to make a possibility available which allows a directionally independent color coding of the condition of an object, in particular of height progression information and/or phase progression information of the condition of the object, wherein reflexes occurring by the illumination of the object in the microscopic recording can be rapidly and reliably removed in order that the contrasts required for the representation can be better represented.

BRIEF DESCRIPTION

The invention has the goal of suggesting a possibility which avoids or at least reduces at least a part of the disadvantages known in the prior art.

The invention solves the problem with a method according to the main claim and with devices according to the coordinate claims.

The subject matter of the main claim relates to a reflection-reduced, contrast imaging method for generating a reflection-reduced contrast image, preferably from microscopic images (e.g. of a digital microscope), in particular for reading height progression information and/or phase progression information of a condition of an object. The reflection-reduced, contrast imaging method comprises:

Illuminating an object with an illumination sequence. The illuminating of the object takes place by one or a plurality (two or more) of illumination sources. In the illumination sequence each illumination source illuminates the object individually.

Creating an illumination image of the object for each illumination of the object of the illumination sequence.

Creating a reflection-corrected illumination image for each illumination image, in each instance by suitably superposing the appropriate illumination image with an illumination image adjacent relative to a first axis and with another illumination image adjacent relative to a second axis.

Superposing two reflection-corrected illumination images adjacent relative to the first axis in order to form a first total axial image of the first axis.

Superposing two reflection-corrected illumination images adjacent relative to the second axis in order to form a second total axial image of the second axis.

Creating a first color progression image based on the first total axial image.

Creating a second color progression image based on the second total axial image.

Transforming the first color progression image and the second color progression image into a color space, and Generating a contrast image based on the transformed, first color progression image and the second color progression image into the color space in such a manner that four pieces of directional information of a height progression of a condition of the object can be represented in a color-coded manner.

The method steps can be carried out in an automated manner here. A piece of height progression information of a condition of an object can comprise in the sense of the invention a piece of information which furnishes indications about a condition of an object in all three spatial dimensions.

An illumination sequence in the sense of the invention can be a concrete sequence of illuminations. To this end an illumination source can be activated, wherein the remaining illumination sources are inactive.

An illumination source in the sense of the invention can be a light source in order to illuminate the object. Therefore, as a result of the arranging of several such illumination sources around the object and illumination of the object which is selective according to the angle can be achieved. For example, the illumination source can be an annular light illumination with several individual light sources (e.g. LEDs) arranged on a lens and with which an illumination of the object can be realized from the different quadrants (North-East-South-West) or from different individual LEDs (N-NO-O-SO-S-SW-W-NW) in the given sequence individually or in a combined manner.

An illumination image in the sense of the invention can be a recording of an object within the illumination sequence.

A superposing of the corresponding illumination image with an illumination image which is adjacent to an axis can be, in the sense of the invention, a procedure in which the same image components of two images are reinforces or attenuated. This can take place, for example, pixel-by-pixel.

A total axial image in the sense of the invention can be an image which is produced by superposing or combining illumination images. Those image images can be used here which are adjacent relative to the same axis. A color progression image in the sense of the invention can be an image created when a corresponding color progression is placed over a total axial image. For example, a first color progression such as, for example, a blue-yellow progression can be placed in a Cartesian coordinate system for the x axis and another color progression, for example, a red-green progression can be placed for the y axis. The color progression image of the x-axis total axial image would then have a blue-yellow color progression. This color progression can then be indicative for a height progression of the object in the horizontal axis while the color progression of the color progression image of the y axis total axial image can be indicative for a height progression of the object in the vertical axis. In particular, a color progression can also be a contrast. If the color progression is a contrast, the height progression of the condition of the object can be represented in a color-coded manner in that a piece of brightness information is used as color coding, wherein the brightness in the image or the brightness of the pixel represents the piece of height information.

A color space in the sense of the invention can be a digitally determined color space such as is used, for example, for computer image screens and/or in the printing area. A reflection-corrected illumination image in the sense of the invention can be an image which is corrected for reflections occurring in it.

The teaching of the invention achieves the advantage that information about the condition of the material as well as height progression information and/or phase progression information of the object can be represented in an image in a reflection-corrected manner. Furthermore, the object can be represented in original colors and the spatial association can be achieved via the brightness. Therefore, a combination of individual contrasts can be achieved in an individual image in a simple and rapid manner in order to represent more information about the object in the object image.

The subject matter of a coordinate claim relates to a reflection-reducing, contrast imaging device for generating a contrast image preferably from microscopic images, in particular for reading height progression information about the condition of the object, in particular preferably for photomicroscoping, which reflection-reducing, contrast imaging device comprises an image recording device and a reflection reducing, contrast imaging device. The image recording device is arranged to detect an image of an object and to transmit it to the reflection-reducing, contrast imaging device. The reflection-reducing, contrast imaging device is arranged to carry out a reflection-reduced, contrast imaging method according to the invention.

An image recording device in the sense of the invention can be a device suitable for scanning and optically representing an object. In particular, an image recording device can be a microscope, especially preferably a photomicroscope. Furthermore, the image recording device can comprise a plurality of illumination sources for the selection of the angles of the object to be imaged.

A reflection-reducing, contrast imaging device in the sense of the invention can comprise a device arranged for generating contrasts from images which are created by the illumination of the object during the recording of the image and for correcting reflections created by it. The reflection-reduced, contrast imaging device can comprise to this end a CPU and as associated architecture.

In particular, the reflection-reducing, contrast imaging device can be integrated in an image processing unit of the microscope and can be an appropriately arranged computer.

The teaching according to the invention achieves the advantage that a device can be economically made available which makes it possible to illuminate an object in an angle-selective manner, to detect a plurality of images at this time and to achieve a combination of individual contrasts of the detected images in a single image in order to represent more information about the object in the object image, wherein the reflections created during the recording can be corrected in the recorded images.

The subject matter of another coordinate claim relates to a computer program product for a reflection-reducing, contrast imaging device according to the invention which can be operated according to a reflection-reduced, contrast imaging method according to the invention. The computer program comprises a program code means in which the steps of the reflection-reducing, contrast imaging method of the invention are implemented by an image processing. The computer program can be implemented in a real-time image processing unit as hardware code or alternatively be designed as pure image reprocessing.

During the advantageous integration of the program code for the reflection-reducing, contrast imaging method into the hardware (digital image processing unit of a photomicroscope) a very rapid image processing can take place and the result can be considered quasi as a "live" image since the recording of the individual images and their image processing take place more rapidly than the replay frequency of the live image.

The teaching of the invention brings about the advantage that the reflection-reduced, contrast imaging method can be operated automatically and can be made available in a simple and economical manner for corresponding, different devices in accordance with the invention. The computer program product is especially advantageously integrated or can be integrated into the image processing unit of the microscope. It can also be integrated as hardware code into the image processing hardware.

The subject matter of another coordinate claim relates to a data carrier comprising a computer program product according to the invention.

The teaching of the invention achieves the advantage that the reflection-reduced, contrast imaging method can be operated automatically and can be made available in a simple and economical manner for corresponding, different devices according to the invention, and can be readily transported in order to be able to directly port the method directly to the appropriate device according to the invention at the location of the device.

Before embodiments of the invention are described in detail in the following, it should be noted that the invention is not limited to the described components or to the described method steps. Furthermore, the terminology used also does not constitute any limitation but rather has only an exemplary character. To the extent that the singular is used in the specification in the claims, the plural is also included to the extent that the context does not explicitly exclude this. Any method steps can be carried out in an automated manner to the extent that the context does not explicitly exclude this.

Other exemplary embodiments of the method of the invention are explained in the following.

According to a first exemplary embodiment in the reflection-reduced, contrast imaging method the superposing of two reflection-corrected illumination images adjacent relative to the first axis to the first total axial image of the first axis and the superposing of two reflection-corrected illumination images adjacent relative to the second axis to the second total axial image of the second axis comprise in a corresponding manner: calculation of two reflection-corrected illumination images adjacent relative to the corresponding first axis and to the second axis to corresponding intermediate images relative to the corresponding first axis and to the second axis, and calculating the corresponding intermediate images to a corresponding first total axial image and to a second total axial image. The particular calculation comprises an addition or a subtraction. However, a scaling, image filtering or some other type of image processing can also be additionally carried out on the individual images—before and/or after the addition or subtraction. This embodiment has the advantage that a part of a method can be repeatedly used with it in order to obtain the appropriate total axial image. This can simplify the method.

According to another exemplary embodiment the reflection-reduced, contrast imaging method furthermore comprises the fact that the superposing of the appropriate reflection-corrected illumination images on the first total axial image of the first axis and on the second total axial image of the second axis comprise a corresponding grey image transformation.

This embodiment has the advantage that the total axial image can be transformed with it in such a manner that non-required color information is omitted in order to be able to use the total axial image in a simple manner for other information.

According to another exemplary embodiment, in the reflection-reduced, contrast imaging method the transforming of the first color progression image and of the second color progression image into the color space comprises: Associating the first color progression image with a first image-providing channel of the color space, and associating the second color progression image with a second image-providing channel of the color space.

An image-providing channel of the color space in the sense of the invention can be a channel of the color space which is used for the visual representation. The RGB color space comprises, for example, three image-providing channels, the R channel, the G channel and the B channel, on which different colors are coded.

This embodiment has the advantage that the image-producing channels of the color space itself can be used for conducting information via the condition of the object.

According to another exemplary embodiment, in the reflection-reduced, contrast imaging method the transforming of the first color progression image and of the second color progression image into the color space comprises an associating of brightness information to a third image-producing channel of the color space.

This embodiment has the advantage that the image can be normalized by the brightness information or can also be used to represent another piece of information via the condition of the object in the color space.

According to another exemplary embodiment, in the reflection-reduced, contrast imaging method the transforming of the first color progression image and of the second color progression image into the color space comprises an associating of a grey value image to a third image-producing channel of the color space.

A grey value image in the sense of the invention can be a black-white piece of progression information about the image. The grey value image can also comprise a contrast.

This embodiment has the advantage that the image can be normalized by the grey value image or can also be used to represent other information about the condition of the object in the color space.

According to another exemplary embodiment the reflection-reduced, contrast imaging method furthermore comprises creating a reflection-corrected total illumination image by a suitable positioning of at least one predominant part of the reflection-corrected illumination images, wherein the grey value image is based on a grey value transformation of the reflection-corrected total illumination image.

This embodiment has the advantage that reflexes can be filtered out even better with it.

According to another exemplary embodiment the reflection-reduced, contrast imaging method furthermore comprises the fact that two pieces of directional information of the four pieces of directional information are arranged along the first axis with each one indicating a direction. And furthermore, the contrast imaging method comprises the fact that two other pieces of directional information of the four pieces of directional information are arranged along the second axis with each one indicating a direction.

This embodiment has the advantage that information about the height progression of the condition of the object can be readily represented in the color space in that the directions of the axes which are used for the generation of the total axial image can also be used for the information about the height progression.

According to another exemplary embodiment the reflection-reduced, contrast imaging method furthermore comprises the fact that the color space is a CIELAB color space, an additive color space, a subtractive color space or a hue-saturation color space.

A CIELAB color space in the sense of the invention can describe all perceptible colors. The most important qualities of the CIELAB color model include the independence from a device and the relationship of the perception. That means that colors are defined independently of the type of their generation or the reproduction technology as they are perceived by a normal observer under a standard light condition. The color model is defined in EN ISO 11664-4.

An additive color space in the sense of the invention can mean that the change of the color impression perceived by the eye takes place by successively adding another color stimulation. The seeing of color with the aid of sensors with different sensitivities to color in the eye is basically an additive mixture. Since the additive color mixing takes place in the eye and the brain, it is also called a physiological color mixing. An additive color space can be, for example, the RGB color space.

A subtractive color space in the sense of the invention can designate the change of a color stimulation upon reflection from the surface of a body by remission or during the passage through a medium (color filter) by transmission. In the narrower sense, subtractive color mixing denotes the extreme principle in which the multiplicity of the color space is reproduced by connecting three color filters in series. For example, the CMY color space or the CMYK color space can be a subtractive color space.

A hue saturation color space in the sense of the invention can be a color space in which the color is defined with the aid of the color value (English hue), the color saturation (saturation) and the brightness value (or the dark stage) (value). This is also called an HSV color space. Similar definitions lead to a HSL color space with the relative luminosity (lightness), and HSB color space with the absolute luminosity (brightness) and an HSI color space with the light intensity (intensity).

This embodiment has the advantage that well-defined and widely disseminated color spaces can be used as a result of which the development costs can be reduced which can lead to a lowering of the expense.

According to another exemplary embodiment the reflection-reduced, contrast imaging method furthermore comprises the fact that the generation of the contrast image takes place as a function of the color space.

This embodiment has the advantage that a decision can be made as a function of the color space about which object information should be represented as color-coded.

According to another exemplary embodiment the reflection-reduced, contrast imaging method furthermore comprises the fact that after the conclusion of the illumination sequence, each illumination source has illuminated the object one time. The contrast imaging method can furthermore comprise the fact that after the conclusion of the illumination sequence each illumination source has illuminated the object exactly once. This embodiment has the advantage that the object is illuminated from all available directions in order to obtain the corresponding object information from all available directions of illumination.

According to another exemplary embodiment the reflection-reduced, contrast imaging method furthermore comprises the fact that in the illumination sequence each illumination source individually illuminates the object.

This embodiment has the advantage that the object only has to be illuminated as is necessary and that only the minimum required number of illumination images must be created in order to represent the desired information about the object.

According to another exemplary embodiment the reflection-reduced, contrast imaging method furthermore comprises for the object for the reflection-reduced, contrast imaging method that it is a diffusely reflecting object. This embodiment has the advantage that the method can be used on objects which have no explicit preferred directions for the reflexion.

The invention therefore allows a method and associated devices to be made available, as a result of which it becomes possible by angle-selective illumination to represent different qualities of a corresponding object.

This can takes place, for example, by:
DPC—Difference of images of opposing illumination directions→phase gradients (BIO) and/or height profile gradients (MAT)
SEC—Sum-Enhanced-Contrast: Sum of all individual images+amount (DPCx—difference of opposing images in the x direction)+amount (DPCy—difference of opposing images in the y direction)→sum of the amount of the rises and PK image superposed→no direct individual information readable, but simultaneous visualization of different effects
DEC—Difference-Enhanced-Contrast: Sum of all individual images−amount (DPCx)−amount (DPCy)→difference of the PK image and of the amounts of the rises→no direct individual information readable but simultaneous visualization of different effects
MSC—Mean-Sum-Contrast: Sum of all differences of the amounts of the individual images with their average values→no directional information−extreme values are emphasized The concepts and/or abbreviations SEC, DEC and MSC are defined in this application as described.

Now use different contrasts and the sum of the individual images (PK) in order to simultaneously code several pieces of information by special color space associations.
HSV-color contrast: Especially the fact that the DIC/DPC contrasts do not represent the information about the material color is problematic. Therefore, the following combination is possible:
Take the PK image
Transform it from RGB into the HSV color space
Replace the V channel (Value) by a grey value image of the desired individual contrast (for example DICx)
Transform the image back to RGB
Carry out, if necessary, a luminosity adaptation
The result now has the same color as the original but contains in the luminosity the information about the individual contrast (for example, a rise in the X direction)
LAB color contrast: it is also disturbing that the directional information of the phase gradient in DIC/DPC can only be visualized in one direction. The following transformation solves this problem:
Use the PK image
Transform it into the Lab color space
Replace the a and b channels by the desired individual contrasts (for example DPCx, DPCy)
Transform the image back into the RGB color space
The result has the same luminosity values as the original image (PK) but the information of the two individual contrasts is stored in a and b.
For example, in DPCx and DPC y all rise directions are represented and color-coded at the same time
RGB color contrast:
Write three different individual contrasts (for example PK, DPCx, DPCy) into the RGB color channels
The result codes in color all three pieces of contrast information.

This generates the advantage that a simple and rapid combination of individual contrasts in a single image can be made possible. Furthermore, the method receives information (color/luminosity) in HSV and LAB.

Furthermore, it becomes possible to make available am optimal illumination of an object for receiving images of the object, and to optically represent the object at the same time and to a very great extent without reflexes created by the illumination. This makes contrasts possible even on reflecting specimens. Furthermore, the reflexes sensitive to the direction of illumination can be suppressed. In addition, no unnatural artefacts are created. The method can therefore be used for direction-sensitive, coaxial illumination and also for illuminations outside of the axis such as, for example, in a dark field.

The object is illuminated from different directions. An intensity image is recorded for each direction of illumination. In order to achieve a reflex correction for an individual image, no total reflex is now calculated but rather the reflex is corrected for each individual image.

The individual image whose reflex was corrected is now calculated as follows:

$$I_k^{corrected} = I_k - \frac{\Sigma_{j \in N(k)} \max(0, I_k - I_j)}{m}$$

wherein N(k) is the amount of the illumination pattern directly adjacent to k and m indicates the number of all adjacent illumination patterns N(k).

The principle behind this is that images of adjacent illumination directions always show similar images of the object, wherein the reflexes are as a rule heavily dependent on the direction of illumination. As a result, during the difference imaging within the break the reflexes remain on the right sides. As a result of the maximum imaging with 0, the sum and the normalization with m, the reflexes are normalized in such a manner subsequently that they can be directly taken from the individual image. The resulting image subsequently contains no or almost no direct reflexes any longer.

This is subsequently carried out with all individual images and the corrected individual images produced in this manner are used for the creation of contrast images. They can also be previously improved by image processing (possible luminosity compensation, etc.). The removal of reflexes can also be put directly into the formula of the calculation of the contrast. For example, the contrast of direction in the x direction results as:

$$DPC_x = \sum_{j \in HK_x} \left( I_j - \frac{\sum_{k \in N(j)} \max(0, I_j - I_k)}{m} - I_{\tilde{j}} + \frac{\sum_{\tilde{k} \in N(\tilde{j})} \max(0, I_{\tilde{j}} - I_{\tilde{k}})}{\tilde{m}} \right)$$

and the following results with amplitude normalization:

$$DPC_x = \frac{\sum_{j \in HK_x} \left( I_j - \frac{\sum_{k \in N(j)} \max(0, I_j - I_k)}{m} - I_{\tilde{j}} + \frac{\sum_{\tilde{k} \in N(\tilde{j})} \max(0, I_{\tilde{j}} - I_{\tilde{k}})}{\tilde{m}} \right)}{\sum_{j \in HK_x} \left( I_j - \frac{\sum_{k \in N(j)} \max(0, I_j - I_k)}{m} + I_{\tilde{j}} - \frac{\sum_{\tilde{k} \in N(\tilde{j})} \max(0, I_{\tilde{j}} - I_{\tilde{k}})}{\tilde{m}} \right)}$$

wherein HKx is the amount of all illumination directions on a semicircle of the illumination pupil in the x direction and all $\tilde{j}$'s are the illumination direction (on the other semicircle) opposite j.

Furthermore, the reflex-corrected individual images and the reflex-corrected contrasts can be used to create color contrasts which either combine (HSV) the RGB value of a specimen with a local piece of object rise information or combine contrasts of different orientation and the luminosity information of the object with each other (LAB or RGB).

Of course, the reflex correction can also be directly integrated into the calculation:

HSV(x)—hue, saturation, value $$H = \text{hue}\left( \sum_{k=1}^{n} \left( I_k - \frac{\sum_{j \in N(k)} \max(0, I_k - I_j)}{m} \right) \right)$$

$$S = \text{saturation}\left( \sum_{k=1}^{n} \left( I_k - \frac{\sum_{j \in N(k)} \max(0, I_k - I_j)}{m} \right) \right)$$

$$V = \sum_{j \in HK_x} \left( I_j - \frac{\sum_{k \in N(j)} \max(0, I_j - I_k)}{m} - I_{\tilde{j}} + \frac{\sum_{\tilde{k} \in N(\tilde{j})} \max(0, I_{\tilde{j}} - I_{\tilde{k}})}{\tilde{m}} \right)$$

LAB—luminosity, value between red and green, value between blue and yellow $$L = \text{luminosity}\left( \sum_{k=1}^{n} \left( I_k - \frac{\sum_{j \in N(k)} \max(0, I_k - I_j)}{m} \right) \right)$$

$$A = \sum_{j \in HK_x} \left( I_j - \frac{\sum_{k \in N(j)} \max(0, I_j - I_k)}{m} - I_{\tilde{j}} + \frac{\sum_{\tilde{k} \in N(\tilde{j})} \max(0, I_{\tilde{j}} - I_{\tilde{k}})}{\tilde{m}} \right)$$

$$B = \sum_{j \in HK_y} \left( I_j - \frac{\sum_{k \in N(j)} \max(0, I_j - I_k)}{m} - I_{\tilde{j}} + \frac{\sum_{\tilde{k} \in N(\tilde{j})} \max(0, I_{\tilde{j}} - I_{\tilde{k}})}{\tilde{m}} \right)$$

In principle, the contrasts can also be mixed in other color spaces (CMY, DMYK and others).

BRIEF DESCRIPTION OF THE DRAWINGS

The invention is explained in more detail in the following using the figures. In the figures.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

Figure 1:
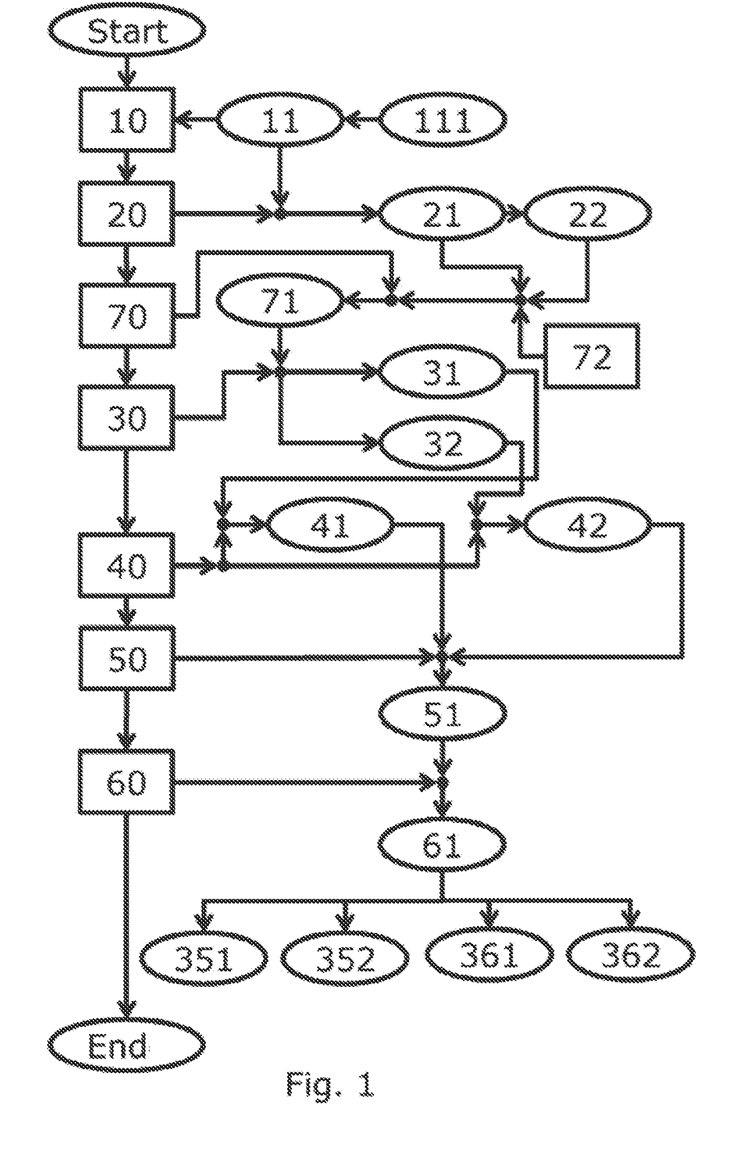
FIG. 1 shows a schematic view of a suggested method according to an exemplary embodiment of the invention.

FIG. 1 shows a schematic view of a suggested method according to another exemplary embodiment of the invention.

FIG. 1 shows a schematic view of a reflection-reduced, contrast imaging method for generating a reflection-reduced, contrast image, preferably consisting of digital, microscopic images, in particular for reading phase progression information and/or height progression information of the condition of an object. The reflection-reduced, contrast imaging method comprises: Illuminating 10 an object by an illumination sequence 11. The illuminating 10 of the object takes place by a plurality of illumination sources 111 and in the illumination sequence 11, each illumination source 111 illuminates the object individually. Creation 20 of an illumination image 21 of the object for each illumination of the object of the illumination sequence 11. Determining 70 a reflection-corrected illumination image 71 for each illumination image 21 by a suitable superposing 72 of the corresponding illumination image 21 with an illumination image 22 adjacent to a first axis 35 and with another illumination image 22 adjacent to a second axis 36. Superposing 30 two reflection-corrected illumination images 71 adjacent to the first axis 35 on a first total axial image 31 of the first axis 35. Superposing 30 two reflection-corrected illumination images 71 adjacent relative to the second axis 36 on a second total axial image 32 of the second axis 36. Creating 40 a first color progression image 41 based on the first total axial image 31. Creating 40 a second color progression image 42 based on the second total axial image 32. Transforming 50 the first color progression image 41 and the second color progression invention 42 into a color space 51 and generating 60 a contrast image 61 based on the transformed 50 first color progression image 41 and on the second color progression 42 into the color space 51 in such a manner that that four pieces of directional information 351, 352, 361, 362 for a height progression of a condition of the object can be represented in a color-coded manner.

Figure 2:
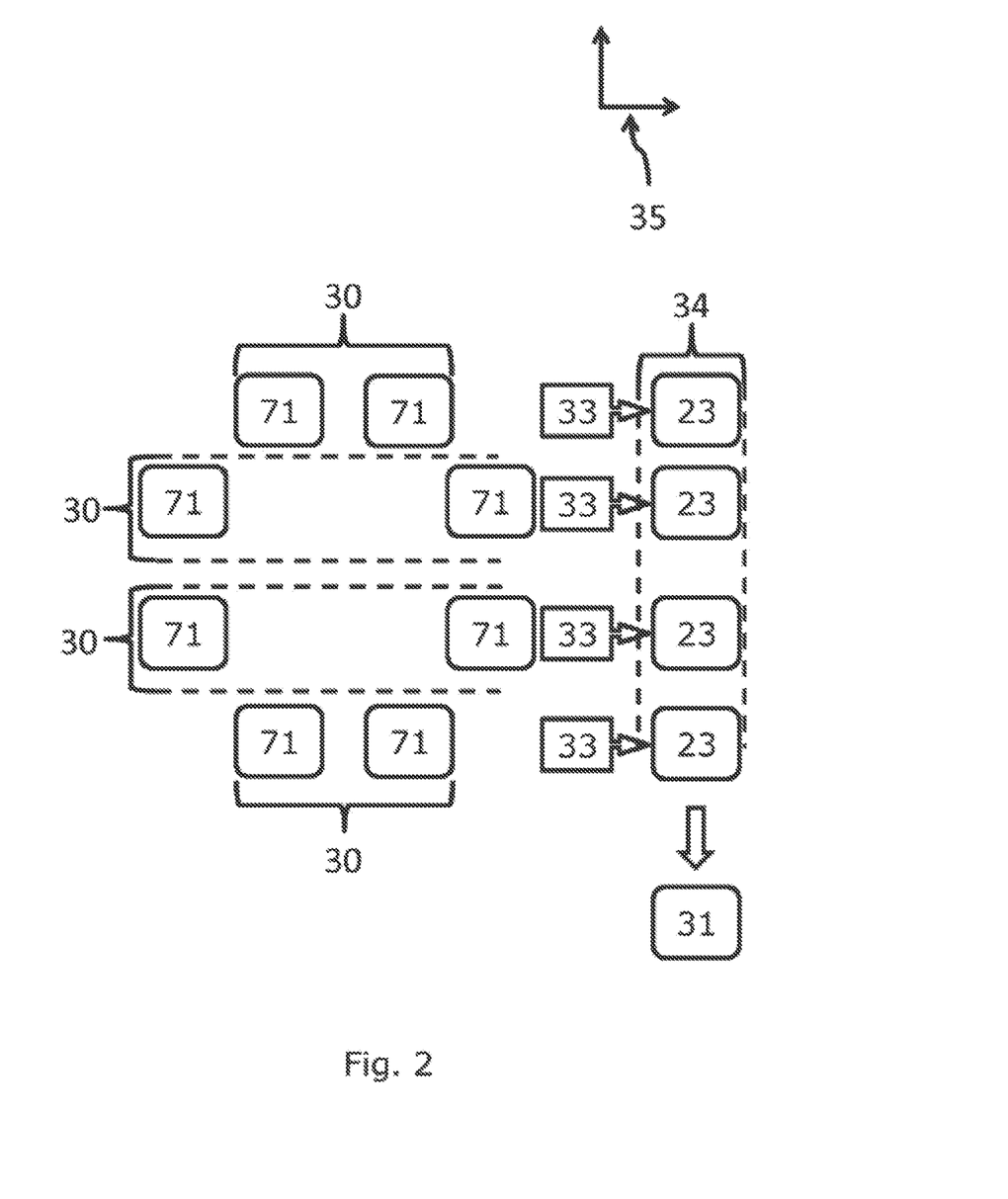
FIG. 2 shows a schematic view of a suggested method according to another exemplary embodiment of the invention.
Figure 3:
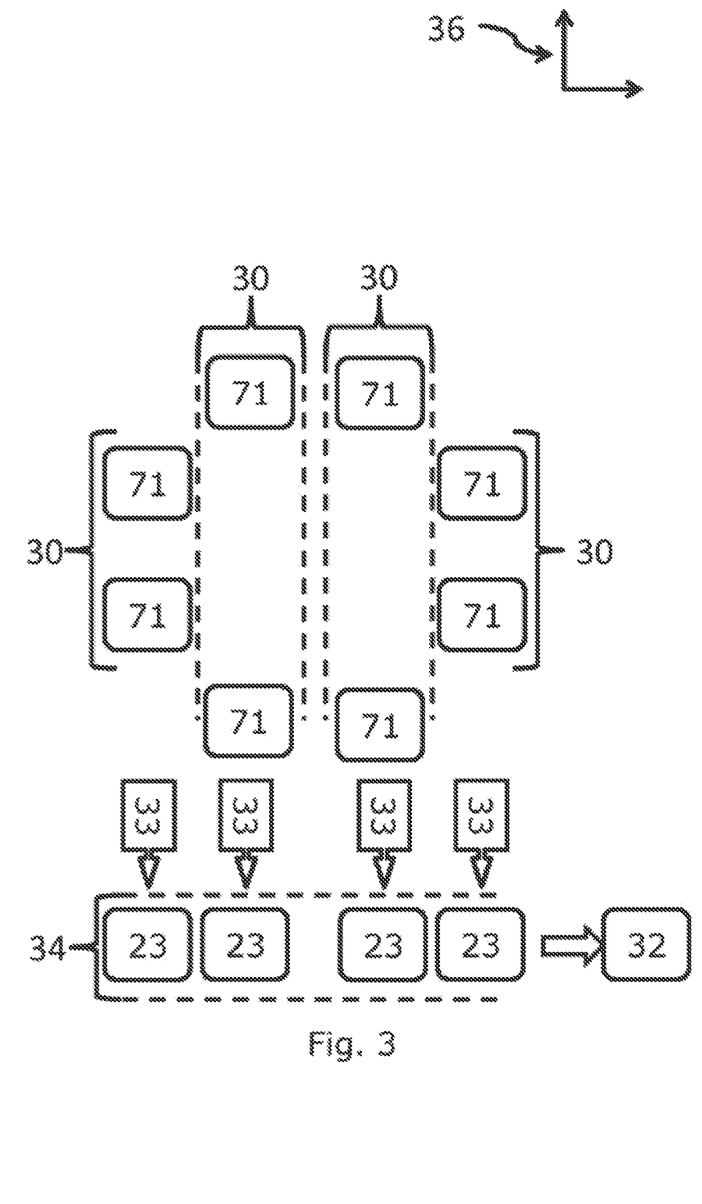
FIG. 3 shows a schematic view of a suggested method according to another exemplary embodiment of the invention.

FIG. 2 and FIG. 3 each show a schematic view of a superposing of adjacent illumination images to a total axial image according to another exemplary embodiment of the invention.

FIG. 2 shows a superposing 30 of two reflection-corrected illumination images 71 adjacent relative to the first axis 35 in order to form the first total axial image 31 of the first axis 35. A calculation 33 of two reflection-corrected illumination images 71 adjacent relative to the corresponding first axis 35 to corresponding intermediate images 23 takes place relative to the corresponding first axis 35. Furthermore, a calculation 34 of the corresponding intermediate images 23 to the corresponding first total axial image 31 takes place.

Accordingly, FIG. 3 shows the superposing 30 of two reflection-corrected illumination images 71 adjacent relative to the second axis 36 in order to form the second total axial image 32 of the second axis 36. During this time a calculation 33 of two reflection-corrected illumination images 71 adjacent relative to the corresponding second axis 36 to corresponding intermediate images 23 relative to the corresponding second axis 36 takes place. Furthermore a calculation 34 of the corresponding intermediate images 23 to the corresponding second total axial image 32 takes place.

The particular calculation 33, 34 comprises an addition or a subtraction.

Figure 4:
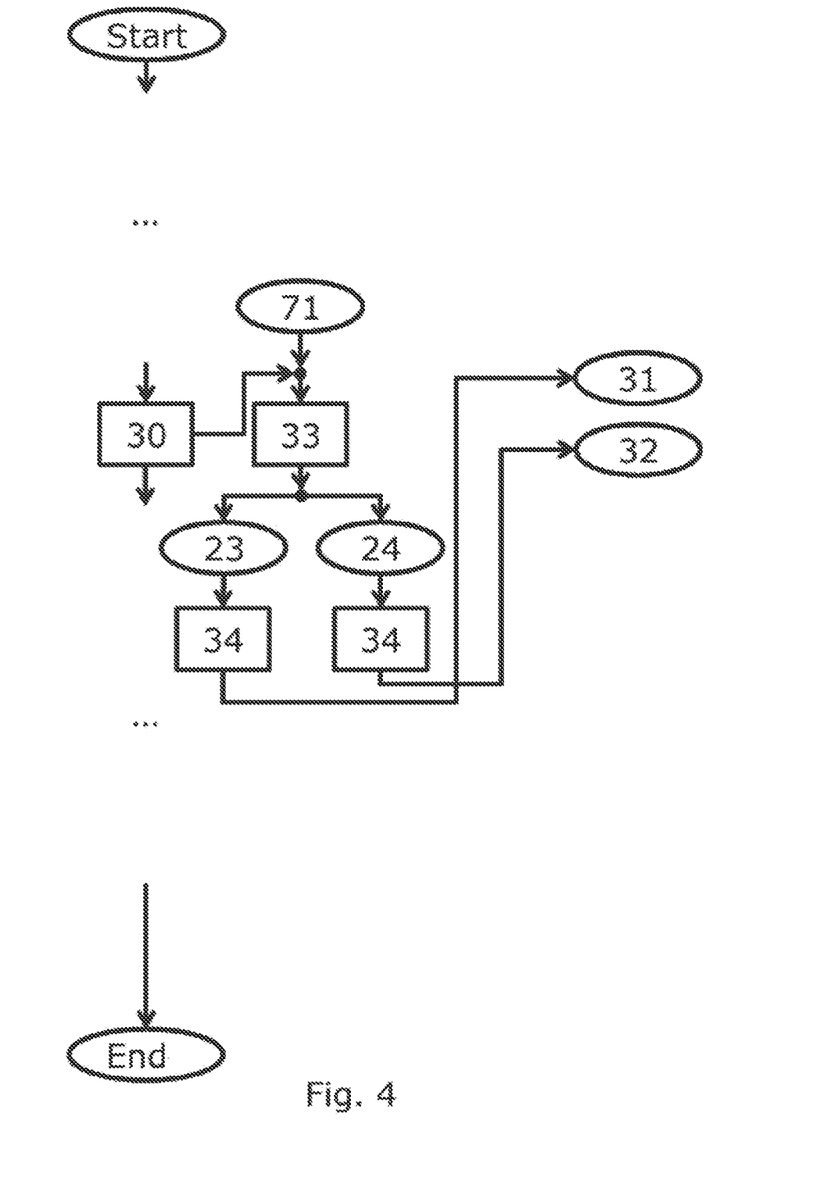
FIG. 4 shows a schematic view of a suggested method according to another exemplary embodiment of the invention.

FIG. 4 shows a schematic view of a suggested method according to another exemplary embodiment of the invention.

FIG. 4 shows a schematic view of a method in comparison to the method of FIG. 1. That which was previously stated regarding FIG. 1 applies in a corresponding manner to FIG. 4. In order to preserve the clarity, the method parts preceding and following the superposing 30 of reflection-corrected illumination images are not shown in FIG. 4. However, they can be gathered from FIG. 1.

As can be gathered from FIG. 4, in the reflection-reduced, contrast imaging method the superposing 30 of two reflection-corrected illumination images 71 which are adjacent relative to the first axis 35 in order to form the first total axial image 31 of the first axis 35 (not shown in FIG. 4), and the superposing 30 of two reflection-corrected illumination images 71 adjacent relative to the second axis 36 (not shown in FIG. 4) in order to form the second total axial image 32 of the second axis 36 additionally comprises: Calculating 33 reflection-corrected illumination images 71 adjacent relative to the corresponding first axis 35 and to the second axis 36 to corresponding intermediate images 23, 24 regarding the corresponding first axis 35 and the second axis 36. And calculating 34 the corresponding intermediate images 23, 24 to a corresponding first total axial image 31 and to a second total axial image 32, wherein the particular calculation 33, 34 is an addition or a subtraction.

Figure 5:
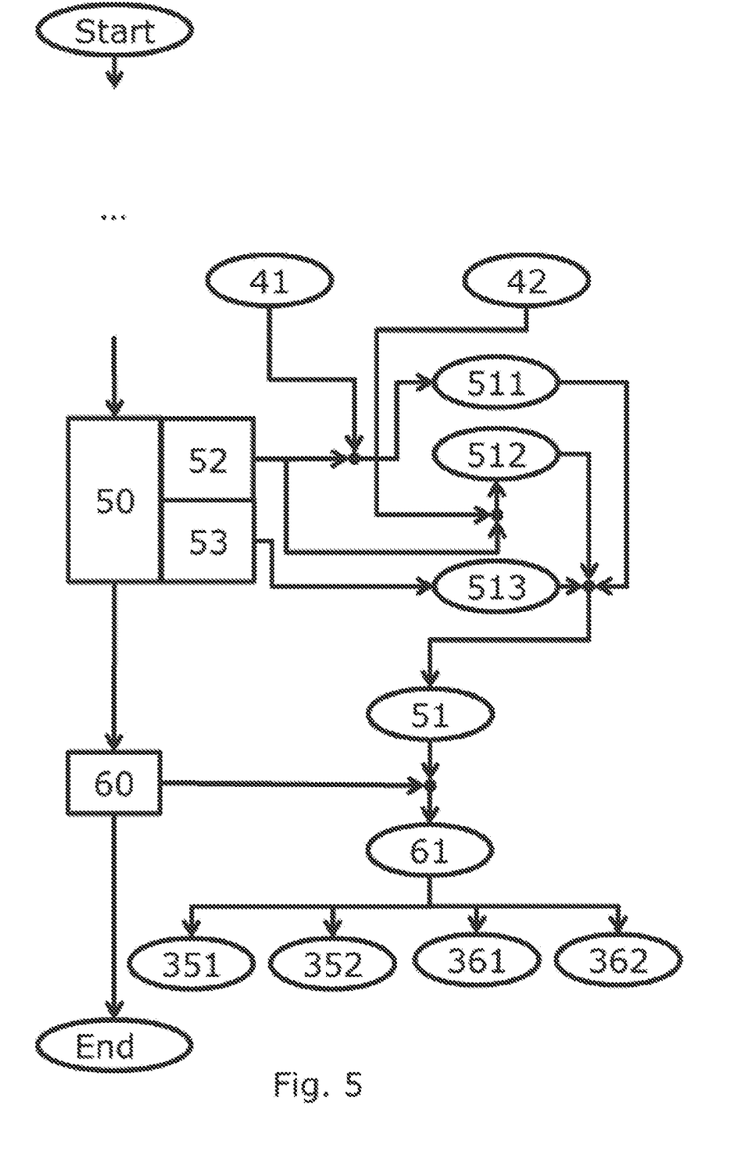
FIG. 5 shows a schematic view of a suggested method according to another exemplary embodiment of the invention.

FIG. 5 shows a schematic view of a suggested method according to another exemplary embodiment of the invention.

FIG. 5 shows a schematic view of a method expanded in comparison to the method of FIG. 1 and FIG. 4. That which was stated previously regarding FIG. 1 and FIG. 4 applies in a corresponding manner to FIG. 5. In order to preserve the clarity, the method parts preceding the transforming 50 are not shown in FIG. 5. However, they can be gathered from FIG. 1 and FIG. 4.

As can be gathered from FIG. 5, in the reflection-reduced, contrast imaging method the transforming 50 of the first color progression image 41 and of the second color progression image 42 into the color space 51 additionally comprises: Association 52 of the first color progression image 41 to a first image-producing channel 511 of the color space 51, and furthermore association 52 of the second color progression image 42 to a second image-producing channel 512 of the color space 51.

In addition, in the example of FIG. 4 the transforming 50 of the first color progression image 41 and of the second color progression image 42 into the color space 51 comprises as association 53 of an additional piece of information such as, for example, a piece of luminosity information and/or a grey value image to a third image-producing channel 513 of the color space 51. In the example of FIG. 5, two pieces of directional information 351, 352 of the four pieces of directional information 351, 352, 361, 362 each indicate a direction along the first axis 35 (not shown in FIG. 5), whereas two other pieces of directional information 361, 362 of the four pieces of directional information 351, 352, 361, 362 each indicate a direction along the second axis 36 (not shown in FIG. 5).

Figure 6:
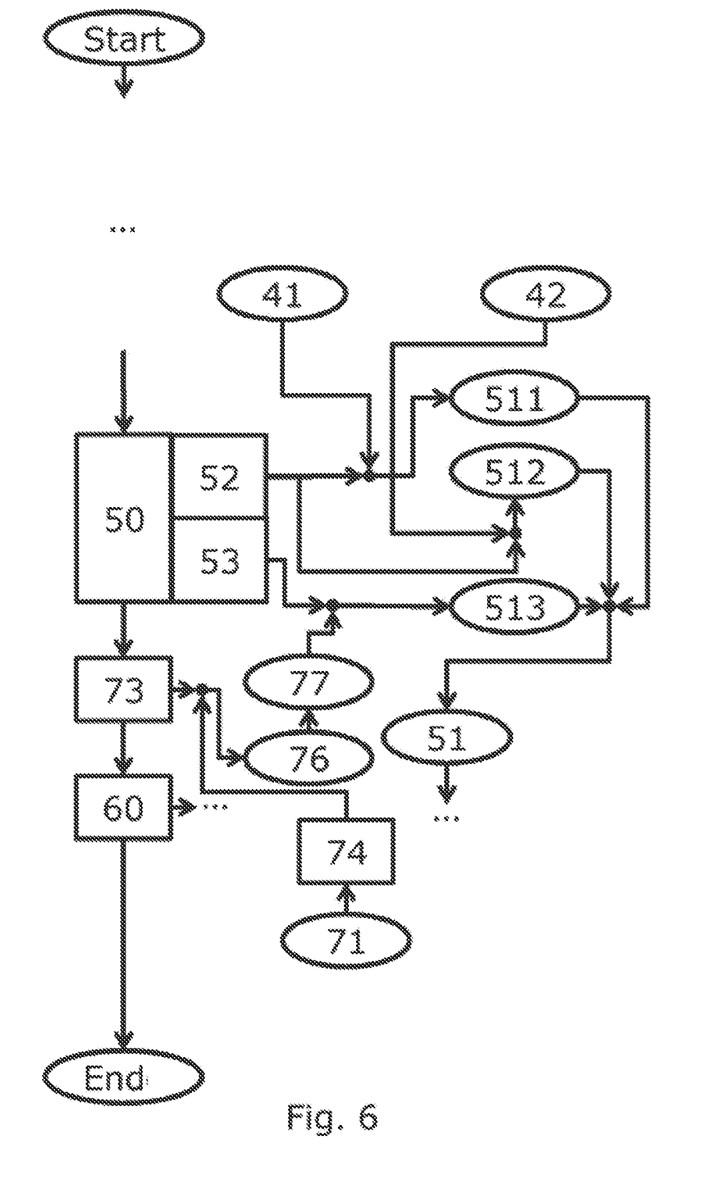
FIG. 6 shows a schematic view of a suggested method according to another exemplary embodiment of the invention.

FIG. 6 shows a schematic view of a suggested method according to another exemplary embodiment of the invention.

FIG. 6 shows a schematic view of a method expanded in comparison to the method of FIG. 1, FIG. 4 and FIG. 5. That which was previously stated for FIG. 1, FIG. 4 and FIG. 5 applies in a corresponding manner to FIG. 6. In order to preserve the clarity, the method parts preceding the transforming 50 are not shown in FIG. 6. However, they can be gathered from FIG. 1, FIG. 4 and FIG. 5.

As can be gathered from FIG. 6, in the reflection-reduced, contrast imaging method the transforming 50 of the first color progression image 41 and of the second color progression image 42 into the color space 51 additionally comprises an association 53 of a grey value image 77 to a third image-producing channel 513 of the color space 51.

Furthermore, the reflection-reduced, contrast imaging method comprises a determining 73 of a reflection-corrected total illumination image 76 by a suitable superposing 74 of at least one predominant part of the reflection-corrected illumination images 71. The grey value image 77 is based here on a grey value transformation of the reflection-corrected total illumination image 76.

Figure 7:
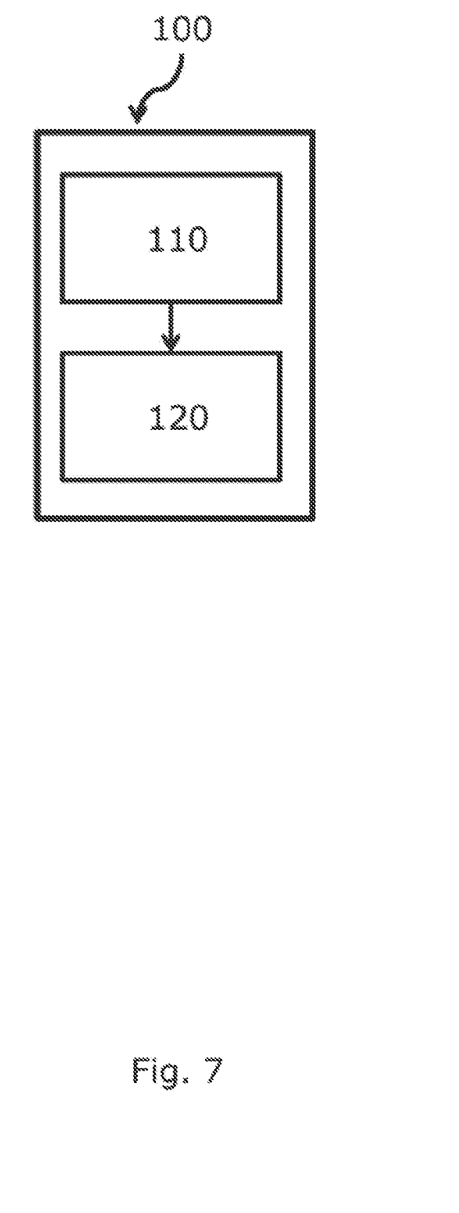
FIG. 7 shows a schematic view of a suggested method according to another exemplary embodiment of the invention.

FIG. 7 shows a schematic view of a suggested device according to another exemplary embodiment of the invention.

FIG. 7 shows a schematic view of a contrast imaging device 100 for generating a contrast image, preferably consisting of microscopic images, especially for reading height progression information of a condition of an object, especially preferably for photo-microscoping. The contrast imaging device 100 comprises: An image recording device 110 and a reflection-reducing, contrast imaging device 120. The image recording device 110 is arranged for detecting an image of an object and transmitting it to the reflection-reducing, contrast imaging device 120. The contrast imaging device 100 is arranged to carry out a reflection-reduced, contrast imaging method according to the invention.

The invention claimed is:

1. A reflection-reduced, contrast imaging method for generating a reflection-reduced contrast-image comprising:
    illuminating an object by two or more illumination sources which illuminate the object individually in an illumination sequence;
    creating an illumination image of the object for each illumination of the object of the illumination sequence;
    determining a reflection-corrected illumination image for each illumination image, in each instance by suitably superposing the appropriate illumination image with an illumination image adjacent relative to a first axis and with another illumination image adjacent relative to a second axis;
    superposing two reflection-corrected illumination images adjacent relative to the first axis in order to form a first total axial image of the first axis;
    superposing two reflection-corrected illumination images adjacent relative to the second axis in order to form a second total axial image of the second axis;
    creating a first color progression image based on the first total axial image;
    creating a second color progression image based on the second total axial image;
    transforming the first color progression image and the second color progression image into a color space; and
    generating a contrast image based on the transformed, first color progression image and the second color progression image into the color space in such a manner that four pieces of directional information of a height progression of a condition of the object can be represented in a color-coded manner.

2. The contrast imaging method according to claim 1, wherein the superposing of the two reflection-corrected illumination images adjacent relative to the first axis in order to form the first total axial image of the first axis, and the superposing of the two reflection-corrected illumination images adjacent relative to the second axis in order to form the second total axial image of the second axis comprises, in a corresponding manner:
    calculating two reflection-corrected illumination images adjacent relative to the corresponding first axis and to the second axis to corresponding intermediate images regarding the corresponding first axis and the second axis, and
    calculating the corresponding intermediate images to a corresponding first total axial image and to a second total axial image, wherein the particular calculating is an addition or a subtraction.

3. The contrast imaging method according to claim 1, wherein the superposing of the corresponding reflection-corrected illumination images in order to form the first total axial image of the first axis and in order to form the second total axial image of the second axis comprises a corresponding grey image transformation.

4. The contrast imaging method according to claim 1, wherein the transformation of the first color progression image and of the second color progression image into the color space comprises:
    associating the first color progression image with a first image-producing channel of the color space, and
    associating the second color progression image with a second image-producing channel of the color space.

5. The contrast imaging method according to claim 1, wherein the transformation of the first color progression image and of the second color progression image into the color space comprises:
    associating a piece of luminosity information with a third image-producing channel of the color space.

6. The contrast imaging method according to claim 1, wherein the transformation of the first color progression image and of the second color progression image into the color space comprises:
    associating a grey value image with a third image-producing channel of the color space.

7. The contrast imaging method according to claim 6, furthermore comprising:
    determining a reflection-corrected total illumination image by superposing at least one predominant part of the reflection-corrected illumination images, and
    wherein the grey value image is based on a grey value transformation of the reflection-corrected total illumination image.

8. The contrast imaging method according to claim 1, wherein two pieces of directional information of the four pieces of directional information indicate a direction along the first axis and two other pieces of directional information of the four pieces of directional information each indicate a direction along the second axis.

9. The contrast imaging method according to claim 1, wherein the color space is a CIELAB color space, an additive color space, a subtractive color space or a hue-saturation color space.

10. The contrast imaging method according to claim 1, wherein the construction of the contrast image takes place as a function of the color space.

11. The contrast imaging method according to claim 1, wherein after the conclusion of the illumination sequence each illumination source has illuminated the object once.

12. The contrast imaging method according to claim 1, wherein the object is a diffusely reflecting object.

13. A device for generating a contrast image comprising:
    an image recording device, and
    a reflection-reducing contrast imaging device,
    wherein the image recording device is configured to detect an image of an object and transfer it to the reflection-reducing contrast imaging device, and the reflection-reducing contrast imaging device is configured to carry out a contrast imaging method according to claim 1.

14. A non-transitory computer-readable storage device comprising instructions to cause an electronic device, upon execution of the instructions by one or more processors of the electronic device, to perform the method according to claim 1.

* * * * *